June 11, 1935. F. E. WOLCOTT 2,004,883
BEVERAGE POT OR THE LIKE
Filed April 26, 1932
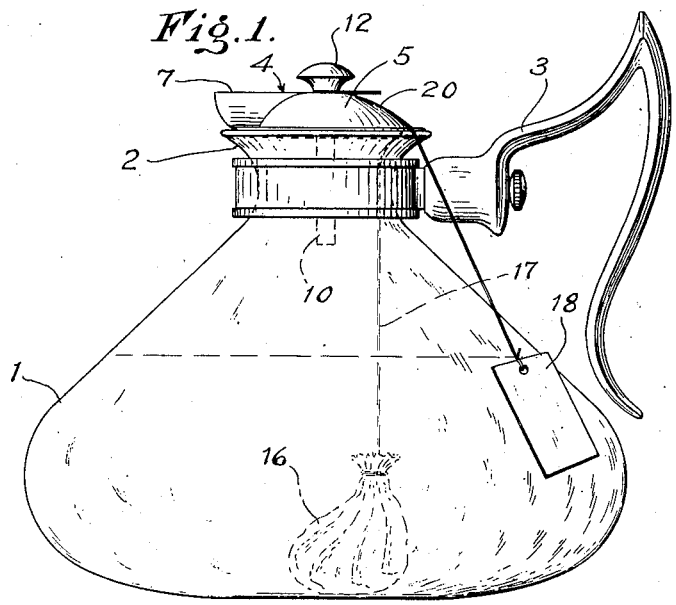
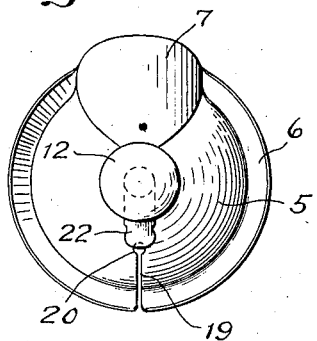
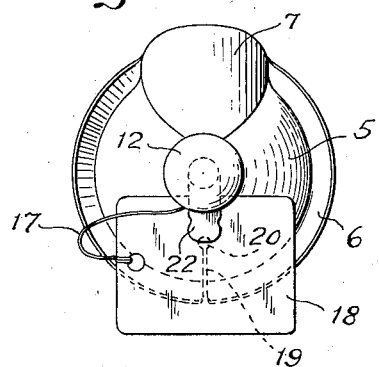
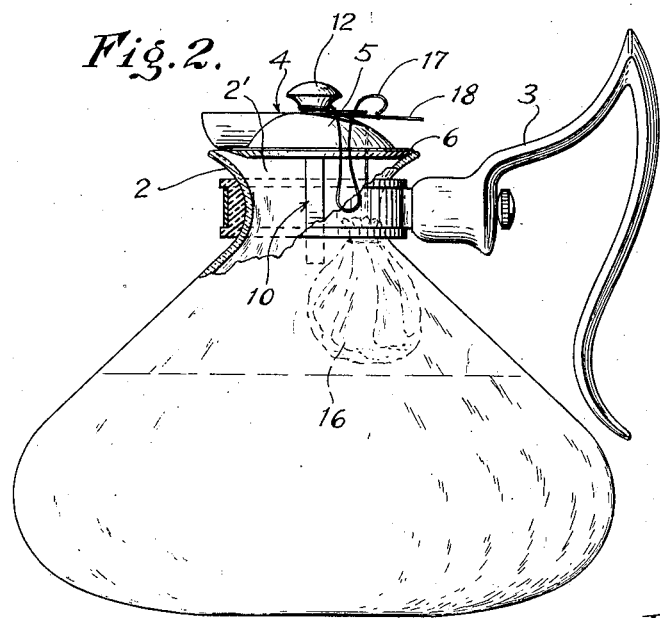
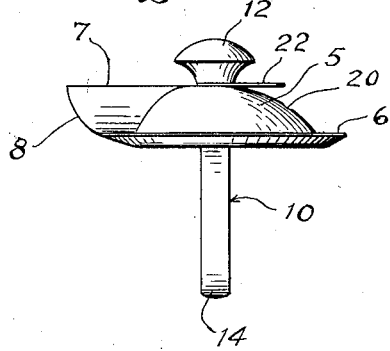
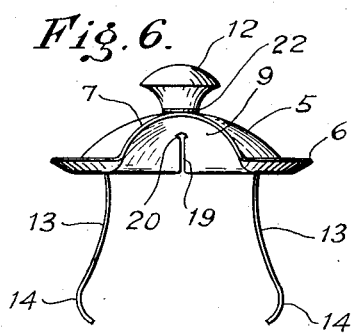
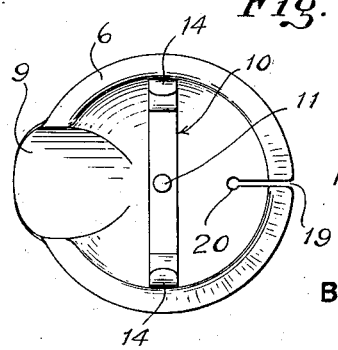
INVENTOR
FRANK E. WOLCOTT
BY
ATTORNEY.

Patented June 11, 1935

2,004,883

UNITED STATES PATENT OFFICE 2,004,883

BEVERAGE POT OR THE LIKE

Frank E. Wolcott, West Hartford, Conn., assignor to Hartford Products Corporation, a corporation of Delaware Application April 26, 1932, Serial No. 607,573

9 Claims. (Cl. 53—3)

My invention relates to beverage pots or the like.

It has among its objects to provide an improved pot adapted to use for beverages for table use and particularly adapted to use as a tea pot. A further object of my invention is to provide an improved pot of the glass bowl type having an improved pouring cover thereon adapted to be connected thereto or disconnected therefrom in an improved manner and secured thereto wholly independently of the handle. Still further objects of my invention are to provide an improved pouring cover construction and one having improved means for positioning the cover in the neck of a bowl or the like, improved means for facilitating the use and positioning of a tea ball while the cover is in place, and improved means whereby the tag or the tea ball string may also be held in such manner as not to interfere with the pouring operation. These and other objects and advantages of my improved construction will, however, hereinafter more fully appear.

In the accompanying drawing, I have shown for purposes of illustration, one embodiment which my invention may assume in practice.

In this drawing,—

Figure 1 is a side elevation of my improved pot, the same being illustrated when in use as a tea pot with a tea ball in brewing position in the pot;

Fig. 2 is a similar view showing the tea ball held in the elevated position it occupies after brewing and during pouring, a portion of the bowl neck being broken away to facilitate illustration;

Fig. 3 is a top plan view of the cover removed from the bowl, the tea ball, string and tag being omitted to facilitate illustration;

Fig. 4 is a plan view similar to Figure 3 but showing the tea ball, string and tag in the position shown in Figure 2;

Fig. 5 is a side elevation of the cover shown in Figure 3;

Fig. 6 is a front view of the cover showing the pouring aperture, and

Fig. 7 is a bottom plan view of the cover.

In this illustrative construction I have shown my improved pot as comprising a bowl 1, preferably of glass, having sloping walls terminating in a narrow curved and flaring neck 2 adapted to provide a combined filling and pouring aperture 2' having a bell-mouth and a throat portion therein of minimum diameter adjacent its bottom, while a handle 3 is connected to the outside of this neck on this constricted portion and a pouring cover, generally indicated at 4 and of an improved construction hereinafter described, is disposed in the aperture 2' in the neck.

Referring more particularly to the cover, it will be noted that it is adapted to be bodily inserted in or bodily removed from the neck 2 and is secured thereto wholly independently of the handle 3. As shown, it includes a cover member, preferably of metal, having a raised or rounded center portion 5 and a short rim 6 forming an angle or corner at the base of this portion 5 extending upwardly and outwardly therefrom and adapted to engage the upper edge of the neck 2 and fit within the latter. Herein, this rim 6 does not extend all the way around the portion 5, instead extending only to the opposite sides of a raised, laterally extended pouring portion, or channel, 7 which projects laterally from one side of the portion 5 and is herein shown as struck up from the material forming the latter. This portion 7, herein, is of substantially semi-circular cross section and has its top straight and substantially as high as the top of the portion 5, while both its top and sides merge into the latter portion and the rim 6. Also, the end of the member 7 remote from the axis of the portion 5, is herein cut away angularly, preferably on the slight curve as shown at 8, to form a pouring aperture 9.

As shown herein, the cover 4 is provided with improved means for positioning the same in the neck 2 with the flange or rim 6 in engagement with the upper edge or rim of the pouring aperture 2'. Herein, these means are in the form of a single spring type holding member of substantially U shape, generally indicated at 10, and having its upper portion suitably attached to the inside of the portion 5 at the axis thereof, as, for example, by the same rivet, screw, or the like, 11, which holds a knob 12 on the cover. This member 10 is herein also provided with spring arms or clips extending below its connection to the cover and preferably slightly bowed inward intermediate their ends as shown at 13, while also being provided on their free ends with wider rounded extensions 14, preferably formed by bending the ends of the arms toward one another as illustrated in Figure 6. Thus, it will be noted that, with the portions 14 normally slightly wider than the minimum diameter of the neck aperture 2', when the member 5 is pushed down into position in the aperture 2', the portions 14 will be forced together as they approach the point of minimum diameter of the neck aperture, and then spring out after they have passed the same, in such manner as to engage the inner wall of the bowl below this point and, consequently, hold the cover securely in position. Of course, whenever it is desired to remove the cover, this may be readily done by simply pulling up the knob 12.

Attention is here also directed to the improved means provided for adapting the bowl to use as a tea pot, and particularly as to use with a tea ball of the usual commercial type which comprises a bag 16 having a string 17 and a usual tag 18 on the end of the string marked to indicate the kind of tea in the bag. More particularly, it will be noted that the portion 5 is herein provided with a radial slot 19 therein extending from a suitable aperture 20, preferably rather wider than the slot, to the periphery of the rim 6. Herein, this slot 19 and aperture 20 are disposed on the opposite side of the knob 12 from the pouring aperture. The aperture 20 is also disposed substantially midway between the knob 12 and the rim and preferably rounded, as shown, to permit free movement of the string 17, while the slot 19 is also of such width as to permit free movement of the latter.

In the use of this construction, it will be evident that when it is desired to use a tea ball, it is possible for the latter to be inserted in the pot with the string 17 extending out through the slot 19 in the cover 4 and the tag 18 disposed in any suitable position outside the pot as, for example, against the side of the bowl 1, as illustrated in Figure 1. After the tea has been brewed to the desired strength, it is also possible for the outer end of the string 17 to be readily grasped and pulled in such manner as to elevate the ball 16 above the level of the water, and then to fix the string in the desired position by winding it around the knob 12 which constitutes an abutment engageable by the string as illustrated in Figure 2. With the tea bag thus elevated, it will be evident that not only may the tea be readily poured whenever desired, but that the bag 16 will engage the sloping portion of the bowl neck in such manner as to minimize interference with pouring. Of course, also, when it is desired to remove the ball, as, for example, before cleaning the pot, it is only necessary to lift the knob 12, whereupon the whole cover 4 with the ball attached thereto, may be lifted out in one operation.

If desired, I may also use other improved means for holding the tea ball in position which are adapted to co-operate with either the string 17 or the tag 18. Herein, these means are in the form of a clip 22, preferably of spring material and clamped between the knob 12 and the portion 5 by the holding means 11 for the member 10. This member 22 herein also extends rearward from the knob 12 substantially at right angles with the axis of the same and toward the slot 19, in such manner as to provide a wedge shaped space between the member 22 and the curved surface of the portion 5 adapted to receive and hold the string 17 or tag 18 when the ball 16 is in the elevated position as shown in Figure 2. Thus it will be evident that not only is the bag securely held so that it cannot accidentally drop back into the tea, but that the tag 18, when slipped between the clip 22 and portion 5, is also definitely positioned so that it cannot, when the pot is tilted during pouring, move around into the path of the tea being poured, as it otherwise might if only an intermediate portion of the string 17 were wrapped around the knob 12.

As a result of my improved construction, it is evident that a bowl, such, for example, as the lower bowl of a vacuum coffee maker, may be readily provided with the pouring cover by simply inserting the cover 4 in the neck thereof. Attention is further directed to the fact that all necessity for the cover remaining constantly on the bowl in such manner as to interfere with the insertion or removal of the upper bowl, is eliminated, at the same time that all necessity for any connection whatever of the cover to the handle is eliminated. It will also be observed that, through the use of my improved structure, it is made possible for the cover to be used either for coffee or tea, as desired, while my improved cover with its slot means and clip and knob, facilitate the use of a tea ball at the same time that they make possible effective control of its string and tag. Further, it will be observed that as a result of my improved cover construction including a raised dome shaped pouring top having a vent on one side thereof and a laterally extended pouring outlet on the diametrically opposite side, that a greatly improved flow of liquid from the bowl is provided. It will also be evident that by reason of the association of the cover with a bowl neck having a bell-mouth of uniform configuration that no need exists for assembling the cover, the handle, and the bowl in any particular angular relationship, and that the cover, by reason of its securing means, can be positioned either in the front of the bowl, diametrically opposite the handle, or at either side of the bowl at will to suit the user. It will also be observed that the construction provided is remarkably simple, consisting of a dome-shaped top and a laterally extended flange which have an up-struck radially disposed portion forming the top wall of a pouring aperture, the bottom wall of which is provided by the oppositely disposed bell-mouth portion of the neck, the cover and the neck thus co-operating to provide an improved pouring outlet in the cover in a new and simplified manner. These and other advantages of my improved construction will, however, be clearly apparent to those skilled in the art.

While I have in this application specifically described one embodiment which my invention may assume in practice, it will be understood that this form of the same is shown for illustrative purposes, and that the invention may be modified and embodied in other forms without departing from its spirit or the scope of the appended claims.

What I claim as new and desire to secure by Letters Patent is:—

1. A pouring cover for a receptacle having a bell-mouth pouring neck comprising a cover member having a pouring outlet at the periphery thereof and having one wall of said outlet open to provide a pouring outlet defined partly by the cover and partly by the bell-mouth of the receptacle, seating flange means extended around the remainder of the periphery of said cover member engageable with the sloping wall of said bell-mouth, and means on said cover member having resilient portions extending below said cover member for releasably engaging the inside of said neck below said mouth and seating said seating flange means in said bell-mouth.

2. A pouring cover for a receptacle having a bell-mouth pouring neck comprising a cover member including a raised body portion having a pouring outlet in the side of said body portion open at the bottom and having said open bottom closable by the bell-mouth of such a neck, a seating flange extended around the remainder of the raised portion of said cover member, and spring means on said cover member within the inner periphery of said flange having depending resilient portions below said cover member for engaging the inside of the neck passage and seating said flange releasably on a bell-mouth receptacle neck.

3. A pouring cover for a receptacle having a bell-mouth pouring neck comprising a cover member including a raised body forming a pouring dome, a pouring member on said body open at the bottom and projecting laterally from said dome and having said open bottom closable by the bell-mouth portion of such a neck, a seating flange extended around the base from edge to edge of said pouring member, and spring means on said raised body within the latter and having depending resilient portions below said flange releasably engaging the inside of the neck passage at circumferentially spaced points and seating said flange on a bell-mouth receptacle neck.

4. A pouring cover for a receptacle having a bell-mouth pouring neck comprising a cover member having a raised pouring dome, a knob carried by said dome, a seating rim extending substantially around the base of said dome having its ends spaced apart to provide a pouring outlet, an outlet member constantly open at the bottom extending laterally from said dome above the space between the ends of said rim and having said open bottom closable by the bell-mouth portion of such a neck, resilient means secured to said cover member within said dome projecting below said rim and engaging the inside of and seating the latter on a receptacle neck, said rim and dome on the opposite side of said knob from said pouring member having a slot therein for receiving a tea ball string.

5. A pouring cover for a receptacle having a bell-mouth pouring neck comprising a cover member having a raised body portion carrying a knob, a seating flange extending substantially around the base of said body portion having its ends spaced apart to provide a gap therein, a pouring outlet in said body portion located above said gap and open at the bottom and having said open bottom closable by the bell-mouth portion of such a neck, means carried by said cover member within the inner margin of said flange having resilient portions projecting therebelow for engaging the inside of and seating said flange on a receptacle neck, said flange and body portion on the opposite side of said knob from said pouring member having a slot therein for receiving a tea ball string, and a holding clip positioned between said knob and body portion for receiving a card on said string.

6. The combination with a pouring bowl having an upstanding neck comprising a single inlet and outlet aperture for the bowl and having a bell-mouth, of a pouring cover for said bowl cooperating with the bell-mouth thereof comprising a cover member having a pouring outlet at its periphery and having one wall of said outlet open to provide a pouring outlet defined partly by the cover and partly by the bell-mouth of the receptacle, seating flange means extending around the periphery of said cover member extending from edge to edge of said pouring outlet, and means on said cover member within the inner periphery of said seating flange means having resilient portions below the latter for releasably engaging said bowl at said neck aperture.

7. The combination with a pouring bowl having an upstanding neck comprising a single inlet and outlet aperture for the bowl and having a bell-mouth, of a pouring cover for said bowl cooperating with the bell-mouth thereof to provide a pouring outlet and comprising a raised dome-shaped pouring top having a pouring aperture in the side of the latter open at the bottom and having said open bottom closed by the oppositely disposed portion of said bell-mouth, a seating flange extending about the remainder of said cover from edge to edge of said aperture, and means for securing said cover removably in said bowl neck with said flange seated on said bell-mouth including resilient means on said cover depending below said flange and releasably engaging said neck aperture.

8. The combination with a pouring bowl having an upstanding neck comprising a single inlet and outlet aperture for the bowl and having a bell-mouth, of a pouring cover for said bowl cooperating with the bell-mouth thereof to provide a pouring outlet and comprising a raised dome-shaped pouring top having a laterally extended peripheral seating flange at its base receivable on said bell-mouth, said top and said flange having a raised radially disposed portion forming the top wall for a pouring outlet projecting laterally from said dome, the complemental bottom wall of which is formed by the oppositely disposed portion of said bell-mouth, and means for securing said cover removably in said bowl neck with said flange seated on said bell-mouth including means carried by said cover engaging said bowl at said neck aperture.

9. The combination with a liquid dispensing bowl having an upstanding neck comprising a single inlet and outlet aperture for the bowl and having a bell-mouth forming the bottom of a pouring channel, of a pouring cover for said bowl neck having a top formed with a co-operating raised pouring channel open at the bottom and with a peripheral rim portion extending from edge to edge of said channel and seatable on said bell-mouth, and means for securing said cover removably on said neck with said rim portion seated on said bell-mouth including neck engaging means carried by the cover co-operating with said bowl at said neck aperture to secure said cover against outward displacement by the weight of liquid in said bowl acting on said cover during pouring.

FRANK E. WOLCOTT.